April 18, 1939. O. HAUCKE Re. 21,052

WHEEL CENTERING AND CAMBER GAUGE

Original Filed Nov. 3, 1936

INVENTOR.
Oswin Haucke
BY Homik J. Schmidt
ATTORNEYS.

Reissued Apr. 18, 1939

Re. 21,052

UNITED STATES PATENT OFFICE 21,052

WHEEL CENTERING AND CAMBER GAUGE

Oswin Haucke, Brooklyn, N. Y.

Original No. 2,090,294, dated August 17, 1937, Serial No. 105,921, November 3, 1936. Application for reissue April 5, 1938, Serial No. 201,192

34 Claims. (Cl. 33—203)

The invention relates to gauges for centering vehicle wheels and for ascertaining the camber and other angles of such wheels. It has for its main object to provide a gauge of extremely simple construction by means of which wheels of an automobile or other vehicle may be readily checked as to their proper alignments and angles. Another object is to provide a gauge which may be used for wheels of all sizes and types. Another object is to provide a gauge having a base easily positioned on a level floor, the base being so constructed that it is easily aligned and positioned with reference to a straight line on the floor and also easily moved and positioned in a predetermined angular relationship with reference to the straight line for the purpose of definitely positioning the wheel in a predetermined angular relationship to the chassis. A cutaway portion may be provided in the base for this purpose. Another object is to provide a frame structure having three variable points of contact with the side of a tire, always in the same plane and pivoted on the base on a horizonal pivot to swing on the base in a plane perpendicular to a central front and rear line through the base.

Another object is to provide a scales and a pointer mounted, one element on the base and the other element on the frame, the zero position on the scales preferably indicating the vertical position of the frame, the scale indicating the angular inclination of the frame.

A further object is to provide a gauge which is easy to operate, readily portable, and which can be operated without any great skill or experience on the part of the operator. Additional objects are to provide a gauge of rugged construction, which has no parts readily broken or apt to get out of order, which occupies but small space and which can be manufactured at a relatively low cost.

These and various other objects and advantages will be readily understood from the following description and from the accompanying drawing of a preferred embodiment of the invention, in which, however, modifications may be made without departing from the scope of the appended claims. In the drawing, Fig. 1 is a front elevation showing the gauge as used when checking the camber angle of a wheel;

Figure 1:
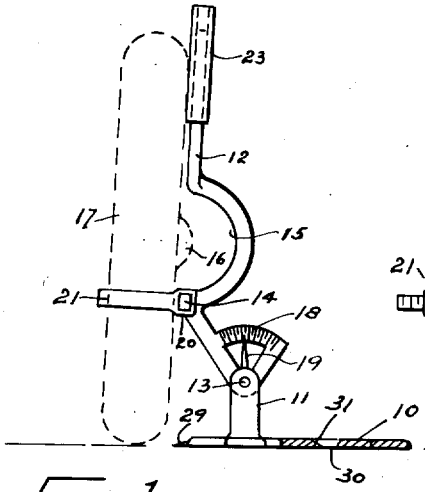
Figure 2:
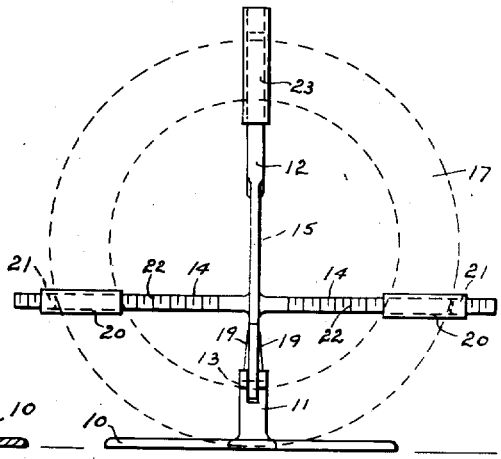
Fig. 2 is a side view of the gauge.
Figure 3:
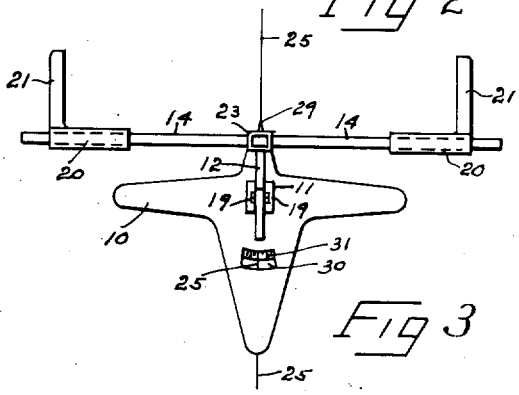
Fig. 3 is a plan view.

Referring now to Figs. 1, 2 and 3, the gauge consists of a base 10 having a level bottom which may if desired incorporate well-known leveling devices and a pedestal bearing 11 in which a gauge arm 12 is rotatingly mounted on a horizontal pivot 13 to swing in a plane perpendicular to a central front and rear line through the base 10. The gauge arm is provided with two lateral members 14 extending horizontally at right angles to the vertical arm 12 so that the ends of the three arms 12, 14, 14 are in the same plane, and the arm itself has an off-set portion, as shown at 15, to accommodate a hub of any size, such as for example the hub 16 of the wheel 17 against which the gauge is shown. A scale 18 is formed on the gauge arm and pointers 19 are mounted on the pedestal 11. The scale 18 is arranged in an arc extending on both sides of a vertical line and lying in the circumference of a vertical circle whose center lies in the center of the pivot 13, and whose radius may be of any suitable length. I preferably imprint a scale on both sides of the gauge arm and use two pointers, as shown in Figs. 2 and 3, so that the scales may be read from either side. The scale 18 may be of any suitable graduations or a plurality of different graduations.

When placing the gauge arm against the upper part of the tire of the wheel and the two transverse members against the side of the tire of the wheel, it is evident that the camber angle of the wheel will be automatically indicated on the scale 18 by the pointer 19 because the horizontal arms 14 contact the sides of the tire of the wheel 17 above the bulge of the tire and below the hub 16 and the vertical arm 12 contacts the side of the tire at the top.

To ascertain the alignment of the front and rear axle I employ the contact members 20 which are slidingly mounted on the transverse members 14. Each of these contact members is provided with an arm 21 which projects at right angles to the transverse members and away from the base when the contact members 20 are moved along. I also employ the scale diagram shown in Fig. 5. This diagram may be imprinted on a platform suitable for supporting a car, but I prefer to place the diagram directly on the floor, either by inserting the lines in the concrete of the floor or by merely painting them thereon.

Figure 4:
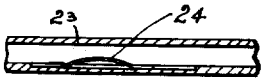
Fig. 4 is a fragmental, enlarged view showing the construction of one of the members used with the gauge.

The transverse members 14 are provided with scales 22 so that the contact members 20 may be spaced an equal distance from the gauge arm 12 by means of these scales and the relative distances of the arms 21 from the center of the upright arm 12 and the pointer 29, may be indicated, and a sleeve 23 is slidingly mounted on the upper end of the gauge arm. This sleeve is preferably held in frictional engagement with the arm by means of a flat spring 24, as illustrated in Fig. 4, so that the sleeve 23 may be held in any desired position on the arm. The sleeve 23 is removable and may be attached when extra-size wheels are to be tested. The sleeve 23 also makes it convenient to use the gauge on automobiles having very low fenders. In such cases the sleeve is lowered on the gauge arm to enable the arm to be swung under the edge of the fender, after which the sleeve is raised between the wheel and the fender.

Figure 5:
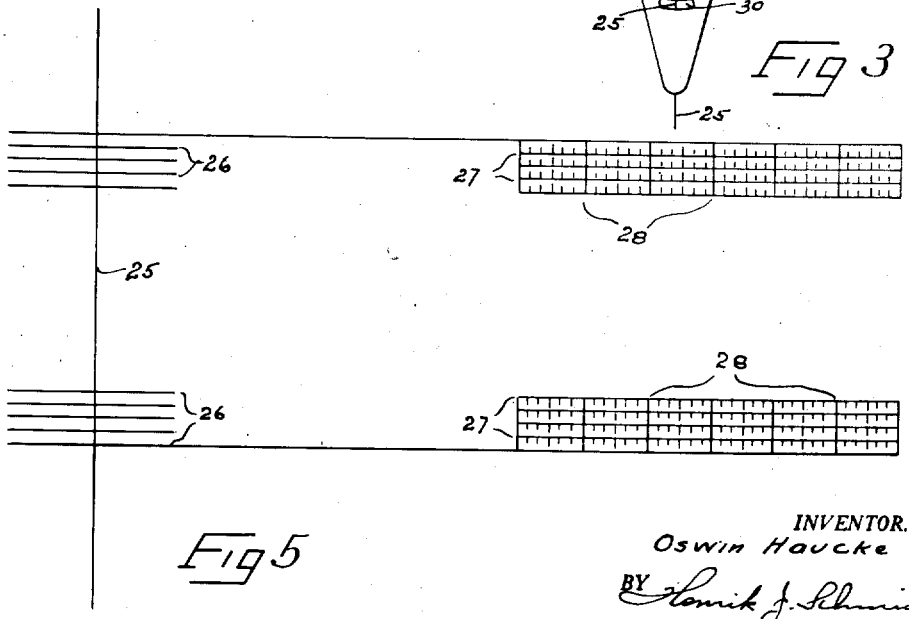
Fig. 5 is a plan view of a floor scale which may be used in combination with the gauge.

Referring now particularly to Fig. 5, the line 25 is used as an indicating line for one of the sets of wheels, as for example the front wheels. The longitudinal lines 26 and 27 coincide with one another and are used to indicate the horizontal distance between the wheels, as for example 56, 58 or 60 inches. The transverse lines 28 are used to indicate the distance between the front and rear axles. In other words, the diagram is used to indicate the wheel base of the car.

If it is desired to check up the alignments of the wheels of an automobile, the automobile is placed on the scale diagram, shown in Fig. 5, preferably with the front wheels on the lines 26 and with the rear wheels on the lines 27 with the wheels in parallel. When properly placed this will indicate the distance between each respective set of wheels. The gauge is now placed against one of the front wheel, as shown in Figs. 1 and 2, and the contact members 20 are placed an even distance from the gauge arm 12; this will place the gauge arm and base pointer 29 as to the center of the wheel. The car and the gauge are now moved until a pointer 29, formed on the front end of the base, coincides with the line 25. The other front wheel is similarly aligned so that both the centers of the front wheel coincide with the line 25. By using the gauge in a similar manner on the rear wheels the scales, indicated by the lines 28, will show whether or not the front and rear axles are parallel. Thus the parallelism of the axles may readily be established by means of the gauge.

An opening 30 of any desired lateral extent is formed in the base 10 and one edge of this opening is provided with a scale 31 of suitable extent and graduations. This scale 31 permits the gauge to be set against the outside of a wheel and turned with the wheel, simultaneously indicating the angle through which the wheel is turned. When the wheels are tested and the pointer 29 is directly on the line 25 the "toe-in" of the wheel may be ascertained by comparing the scale 31 with the line 25 which is visible through the opening 30. Thus, not only will the gauge indicate the camber angle of the wheels and the parallelism of the axles, but the amount of "toe-in" of the wheels as well. As shown in Fig. 3 the sides of the base 10 below the pointer 29 flare outwardly at definite angles, which may be any desired angles, so that these sides may furnish lines of reference when the gauge is swung about against a wheel until one or the other of these lines coincides with the line 25 on the floor.

A vehicle to be tested is driven on a level floor space which is marked with a scale diagram comprising lines 25, 26, 27 and 28. The vehicle is placed in such a position that the centers of the front wheels rest on line 25 and by comparing the edges of the tires of the front wheels with the lines 26 on either side and by comparing the tires of the rear wheels with the lines 27 on either side the wheels of the vehicle are positioned in parallel. The spacings between the lines 26 and the spacings between the lines 27 are equal and these lines are parallel. There are five lines in each corner parallel with one another and the automobile wheels are positioned so that they truly center on the intermediate lines of each corner diagram.

The gauge is placed against the tire of the left front wheel approximately centrally thereof with the wheel in the straight-ahead position. The gauge has the vertical contact arm 12 which may carry an adjustable sleeve 23 and which supports on opposite sides horizontal contact arms 14, 14, which may carry sliding squares 20, 21. The vertical arm 12 contacts the upper center side surface of the tire, through the sleeve 23, approximately at the vertical center diameter of the wheel. The slides 20 carry right angle extensions 21 which may engage the tread periphery of the tire on opposite sides below the hub 16, or below the horizontal diameter but above the bulge of the tire. The camber angle of the wheel is read from the scale 18 by the pointer 19 when the gauge is positioned as above described.

The sliding squares 20, 21 are now pressed against the tread periphery of the tire, the scale readings 22 on both sides of the vertical arm 12 are compared, and the vehicle is pushed forwards or rearwards until the reading of the scales is the same on each side; the pointer 29 on the base 10 then indicates the exact center of the front wheel on the line 25. If the pointer 29 does not coincide with the line 25, the vehicle is moved until the pointer 29 does coincide with the line 25 and the line 25 corresponds with the zero mark on the scale 31. The foregoing adjustments place the front wheels of the vehicle in a center position and at right angles as to line 25 of the scale diagram. A pair of wheel chucks may be placed under the rear wheels to keep the vehicle from shifting with reference to the scale diagram when the steering mechanism of the vehicle is turned for other tests.

The gauge is now taken around and placed against the right front wheel proximately at the center and the camber angle is read. To read the toe-in of the front wheels, the sliding squares 20, 21 are pressed against the periphery of the tire and the gauge adjusted until the scale readings on both scales 22 are the same. If the front axle is parallel and at right angles the pointer 29 on the base 10 coincides with the line 25. The amount of toe-in, if any, can be read on scale 31 reading from zero to line 25. In cases where the front axle is not parallel with the line 25, the gauge may be shifted until the pointer 29 does coincide with the line 25. The toe-in will also in this position be indicated by scale 31. The distance of the front axle from parallel and right angular position will be indicated on scales 22 which measure the distance the base pointer 29 is off-center to the line 25. The foregoing readings are made possible by the fact that the horizontal arms 14 are at right angles or equal triangles to the vertical gauge arm 12 which coincides with a vertical line through the pointer 29 and is in a perpendicular triangle through the pointer 29 and the zero mark on the scale 31.

The parallelism and right angular position of the rear axle is checked in a simpler way. The gauge is placed against the tire of the rear wheel and is centered with reference thereto by the scales 22. The pointer 29 on the base locates the center of the rear wheel on the floor scale 28, which indicates the distance between the front wheel center and the rear wheel center, or the wheel base of the vehicle. If the wheel base of the left side is equal to the wheel base on the right side, the rear axle is parallel. A tolerance of ⅛'' may be permitted, but a greater variation will cause the rear wheel, when traveling, to be out of parallel with the front wheel, or off track. The parallelism, a bended rear axle, and toe-in or toe-out of the rear wheels, may also be checked by the pointer 29 and the scale 31 by comparing them with one of the lines 28. These checks are made possible due to the horizontal arms 14 and the vertical gauge arm 12 being in a plane at right angles to the vertical plane through the base pointer 29 and the zero mark on the scale 31. The camber angle of the rear wheels may be read on the scale 18 by the pointer 19.

The caster angle of the front axle, or the king-pin angle, is taken by placing the gauge against the front left wheel with vertical gauge arm 12 in center of wheel. The pointer 29 and the zero mark on scale 31 coincide with the line 25 of the scale diagram when the wheel is in a straight-ahead position. To determine the camber angle of a front wheel turned to the left, the steering wheel is turned until the left wheel reaches a predetermined angle with reference to the scale diagram line 25, the angle being located by means of the gauge base pointer 29, and the base scales 31, the base scale 31 being graduated in degrees with reference to the base pointer 29 and the cut-away portion in the base being large enough to permit a reading of the scale with reference to a straight horizontal line 25 drawn on the floor. If the wheel is turned a predetermined angle, a line cited through the cut-away portion of the base passing through the predetermined index on the scale 31 and the pointer 29, will coincide with the diagram line 25 on the floor. The camber angle of the wheel in this position will be indicated on the scale 18 by the pointer 19. The left wheel is now turned the same predetermined angle to the right and the gauge is placed in position as previously described. The pointer 19 will indicate the caster angle on the scale 18 by taking the distance between the original and the indicating position. If there be no caster angle, the scale will read the same at each turn, but if there is a caster angle the distance between the two positions will indicate the caster angle in positive or negative readings.

The same procedure is followed for angle readings on the right end front wheel. Caster angle equals the change of camber angle from a predetermined angle right turn to the same predetermined angle left turn or vice versa.

The king-pin inclination is taken by placing the gauge against the wheel, the pointer 29 and the zero mark on the scale 31 being in coincidence with the line 25. Scale 18 is now read for the pointer 19 position and the steering wheel is turned left through the predetermined angle indicated by the line 25, base scale 31 and the pointer 29. The king-pin inclination is the angular movement of the pointer 19 from the original to the indicated positions. King-pin inclination angle equals: The change of the wheel camber angle from a straight ahead position to a predetermined angle of left turn, plus the change of wheel camber angle from a straight ahead position to the same predetermined angle of right turn; or vice-versa. Note; if one of the angles should read in the negative, then subtract from positive; otherwise add the two angles. The king-pin inclination formula is: change of camber angle of 20 degrees right turn plus change of camber angle of 20 degrees left turn. The king pin inclination formula (by marking side of tire) is: Angle of distance of front space plus angle of distance of rear space, divided by 2. The caster angle is the change of camber angle from 20 degrees right turn to 20 degrees left turn. On all angle measurements, after there is a line 25 on the floor no sliding squares 26, 21 are required. The king-pin inclination may also be taken by turning the left wheel to the right through the predetermined angle with the gauge against the tire and drawing a line on the tire coinciding with the upper edge of the horizontal gauge arms 14, 14, then the wheel is turned to the left through the predetermined angle and another line is drawn coinciding with the upper edge of the gauge arm 14, 14.

The wheel is turned to straight ahead position, the gauge is placed against the tire and the position of pointer 19 noted. The gauge base is moved toward the wheel until horizontal arms 14 on the gauge arm 12 coincide with the upper pencil line of smaller distance; the degree of movement is indicated by pointer 19 which equals the angle of upper line of the smaller distance. The upper line of the larger distance is measured in the same manner and the angles of both lines added, and divided by 2, which equals the king-pin inclination angle. Care must be taken in taking the king-pin inclination in this manner that the wheel is in a stationary or locked position; it should not revolve during the operation. If the distance between the pencil lines on the wheel are equal on the front side and rear side of the tire, no castor angle exists, but if they are not equal the smaller distance is the king-pin inclination angle minus caster, the larger distance is the king-pin inclination plus the caster angle, then add smaller and larger distance angles and divide by 2; equals king-pin inclination. The caster angle may also be taken in this manner by measuring the distance of larger and smaller space in the manner described, the difference divided by 2 being the caster angle. From the foregoing it is clear that the king-pin inclination angle and the king-pin angle or caster angle can be taken in the two ways described.

The turning radius of the vehicle may also be taken with this gauge by comparing the gauge base line pointer 29 and scale 31 with the floor diagram line 25 and moving the gauge to the limit position. Toe-out of the wheel is taken in the same manner.

*Mode of operation of the gauge without floor diagram*

The vehicle to be tested is driven on a level floor space. The gauge is placed against the wheel and centered as before described. The base pointer 29 and zero mark of the scale 31 will indicate the center of the wheel. The floor is marked on pointer 29 and at the zero mark of scale 31 and the gauge is removed and a line drawn through both these marks. Proceeding then in the same manner as above described the camber angle, caster angle, king-pin inclination and wheel-base can be measured without a floor diagram.

*Mode of operation of the gauge with a turn table such as shown in Christensen Patent 1,927,488*

The gauge is placed on the base 14, a platform extension being used to bring the base 14 level with the upper surface of the turn table. King-pin angle, camber angle, toe-in and toe-out and the turning radius may be taken in this manner. No sliding arms 21 are needed on the gauge in an arrangement of this type.

A pair of similar low-type turn-tables, such as shown in the Christensen patent may be placed under the front wheels on a level floor to facilitate the easy turning of the front wheels and the gauge may be used to make the measurements above-described with the exception of the caster angle. This angle can also be taken correctly by placing platforms under the rear wheels, at the same height as the front wheel turn tables to bring the wheel structure level with the front structure.

A pair of similar type turn tables may be placed level with the floor and then no rear platforms are necessary to obtain correct results.

A pair of turn tables with welts in the upper face of the turn table platform, such as shown in my Patent 2,087,909, equipped with a platform extending outwardly on the upper section of the turn table to provide a resting place for the gauge, may be used. No sliding square 20, 21 is required when the gauge is used in this manner for taking king-pin angles. This type of turn table may be placed level with the floor to afford raising of the rear wheels level with the front wheels for correct caster angle readings. All other readings may be obtained in the same manner as above described.

From the description, it is evident that this gauge can be used in different manners for the correct readings of all steering angles, wheel and axle alignment dimensions to easily detect and correct such conditions as out of alignment of the steering angles, king-pin angles, camber angles, shifted or bended axles, and distorted chassis.

The scale 18 and pointer 19 may be reversed in such a manner that the base 10 carries the scale 18, and vertical arm 12 carries the pointer 19. The essential thing in the construction of my improved gauge is a vertical arm and horizontal contact arms, the vertical arm and horizontal contact arms being at right angles or equal triangles to each other, and the vertical arm and horizontal contact arms being pivotally mounted at right angles to a base 10. It is this vertical and right-angle relationship which makes possible taking any angular measurements of any object having a flat surface and revolving on an angular support. The scales or indicating means can be mathematically arranged according to the construction of the scales and pointer and the base 10 may be constructed in any angular form or shape desired for indicating means at right angles to the vertical arm 12 and the horizontal arms 14, 14.

Variations may be made, parts may be substituted for others, parts may be used without others, sizes and dimensions may be varied, and parts may be omitted, all within the spirit and scope of the appended claims.

I claim:

1. A gauge of the class described comprising a base, a vertical gauge arm pivotally mounted on said base and having sidewardly-extending members for contacting with the sides of a wheel, a scale associated with said gauge arm, a pointer associated with the base for indicating on the scale the camber angle of the wheel being tested, and a sleeve slidingly mounted on the gauge arm to enable it to be lengthened or shortened.

2. In combination; a gauge comprising a base, a vertical gauge arm pivotally mounted on said base and having sidewardly-extending members for contacting with the sides of a vehicle wheel, two contact arms slidingly mounted on the sidewardly-extending members and adapted to engage with the periphery of the wheel, means for locating said arms at an equal distance from the vertical gauge arm, a scale diagram for properly locating the wheels of a vehicle, said scale diagram having lines for indicating the distance between the front and the rear wheel of the vehicle; and a pointer associated with the base of the gauge for indicating, by aligning it with the lines of the scale diagram, the parallelism of the axles of the vehicle being tested.

3. In combination; a gauge comprising a base, a vertical gauge arm pivotally mounted on said base and having sidewardly-extending members for contacting with the sides of a vehicle wheel, two contact arms slidingly mounted on the sidewardly-extending members and adapted to engage with the periphery of the wheel, means for locating said arms at an equal distance from the vertical gauge arm, a scale diagram for properly locating the wheels of a vehicle, said scale diagram having lines for indicating the distance between the front and the rear wheel of the vehicle as well as the distance between each set of front and rear wheels; and a pointer associated with the base of the gauge for indicating, by aligning it with the lines of the scale diagram, the parallelism of the axles of the vehicle being tested.

4. In combination; a gauge comprising a base, a vertical gauge arm pivotally mounted on said base and having sidewardly-extending members for contacting with the sides of a vehicle wheel, two contact arms slidingly-mounted on the sidewardly-extending members and adapted to engage with the periphery of the wheel being tested, means for locating said arms at an equal distance from the vertical gauge arm, a scale diagram for properly locating the wheels of a vehicle, said scale diagram having lines for correctly locating the wheels of the vehicle; and means associated with the base of the gauge for alignment with the lines of the scale diagram to ascertain the angularity of the wheels in relation to the vehicle being tested.

5. In combination; a gauge comprising a base, a vertical gauge arm pivotally mounted on said base and having sidewardly-extending members for contacting with the sides of a vehicle wheel, two contact arms slidingly mounted on the sidewardly-extending members and adapted to engage with the periphery of the wheel being tested, means for locating said arms at an equal distance from the vertical gauge arm, a scale diagram for properly locating the wheels of a vehicle, said scale diagram having lines for correctly locating the wheels of the vehicle; and a means associated with the base of the gauge for alignment with the lines of the scale diagram to ascertain the angularity of the wheels in relation to the vehicle being tested, said means comprising a pointer and a graduated scale.

6. A gauge of the class described comprising a base, a vertical gauge arm pivotally mounted on said base and having sidewardly-extending members for contacting with the sides of a wheel, two contact arms slidingly mounted on the sidewardly-extending members and adapted to engage with the periphery of the wheel, means for locating said arms at an equal distance from the vertical gauge arm, a pointer and a scale associated with the gauge arm and the base for indicating the camber angle of the wheel being tested, and a sleeve slidingly mounted on the gauge arm to enable it to be lengthened or shortened.

7. A gauge of the class described comprising a base, a vertical gauge arm pivotally mounted on said base and having sidewardly-extending members for contacting with the sides of a wheel, two contact arms slidingly mounted on the sidewardly-extending members and adapted to engage with the periphery of the wheel, means for locating said arms at an equal distance from the vertical gauge arm, and a pointer and a scale associated with the gauge arm and the base for indicating the camber angle of the wheel being tested.

8. A gauge of the class described comprising a base, a vertical gauge arm pivotally mounted on said base and having sidewardly-extending members for contacting with the sides of a wheel, said members extending horizontally along a line that is above the bulge of the tire, two contact arms slidingly mounted on the side-wardly-extending members and adapted to engage with the periphery of the wheel, means for locating said arms at an equal distance from the vertical gauge arm, and a pointer and a scale associated with the gauge arm and the base for indicating the camber angle of the wheel being tested.

9. A gauge of the class described comprising a base, a vertical gauge arm pivotally mounted on said base and having sidewardly-extending members for contacting with the sides of a wheel, said members extending horizontally along a line that is above the bulge of the tire, two contact arms slidingly mounted on the sidewardly-extending members and adapted to engage with the periphery of the wheel, means for locating said arms at an equal distance from the vertical gauge arm, the point of contact of the vertical arm and the side of the tire of the wheel being removed from the horizontal line through the horizontal members a distance that is always greater than the radius of the complete wheel, and a pointer and a scale associated with the gauge arm and the base for indicating the camber angle of the wheel being tested.

10. A gauge of the class described comprising a base, a vertical gauge arm pivotally mounted on said base and having sidewardly-extending members for contacting with the sides of a wheel, said vertical gauge arm having a bend therein for passing the hub of the wheel, two contact arms slidingly mounted on the sidewardly-extending members and adapted to engage with the periphery of the wheel, means for locating said arms at an equal distance from the vertical gauge arm, and a pointer and a scale associated with the gauge arm and the base for indicating the camber angle of the wheel being tested.

11. A gauge of the class described comprising a base, a vertical gauge arm pivotally mounted on said base and having sidewardly-extending members for contacting with the sides of a wheel, said vertical gauge arm having an outward bend therein for passing the hub of the wheels, two contact arms slidingly mounted on the sidewardly-extending members and adapted to engage with the periphery of the wheel, means for locating said arms at an equal distance from the vertical gauge arm, and a pointer and a scale associated with the gauge arm and the base for indicating the camber angle of the wheel being tested.

12. A gauge of the class described comprising a base, a vertical gauge arm pivotally mounted on said base and having sidewardly-extending members for contacting with the sides of a wheel, said members extending horizontally along a line that is above the bulge of the tire and below the hub of the wheel, two contact arms slidingly mounted on the sidewardly-extending members and adapted to engage with the periphery of the wheel, means for locating said arms at an equal distance from the vertical gauge arm, and a pointer and a scale associated with the gauge arm and the base for indicating the camber angle of the wheel being tested.

13. A gauge of the class described comprising a base, a vertical gauge arm pivotally mounted on said base and having horizontal sidewardly-extending members for contacting with the sides of a wheel, two contact arms slidingly mountd on the sidewardly-extending members and adapted to engage with the periphery of the wheel, means for locating said arms at an equal distance from the vertical gauge arm, and a pointer and a scale associated with the gauge arm and the base for indicating the camber angle of the wheel being tested.

14. A gauge of the class described comprising a base having a centrally positioned pointer for centering the gauge with reference to an automobile axle and about which the gauge can be moved as a pivot horizontally, a vertical gauge arm pivotally mounted on said base and having sidewardly-extending members for contacting with the sides of a wheel, two contact arms slidingly mounted on the sidewardly-extending members and adapted to engage with the periphery of the wheel, means for locating said arms at an equal distance from the vertical gauge arm, and a pointer and a scale associated with the gauge arm and the base for indicating the camber angle of the wheel being tested.

15. A gauge of the class described comprising a base, having a centrally positioned pointer about which the base can be moved as a pivot and a scale located adjacent a central line through the base and its pointer, a vertical gauge arm pivotally mounted on said base and having sidewardly-extending members for contacting with the sides of a wheel, two contact arms slidingly mounted on the sidewardly-extending members and adapted to engage with the periphery of the wheel, means for locating said arms at an equal distance from the vertical gauge arm, and a pointer and a scale associated with the gauge arm and the base for indicating the camber angle of the wheel being tested.

16. A gauge of the class described comprising a base, having a centrally positioned pointer about which the base can be moved as a pivot horizontally and a scale located on both sides of the central line through the base and its pointer, a vertical gauge arm pivotally mounted on said base and having sidewardly-extending members for contacting with the sides of a wheel, two contact arms slidingly mounted on the sidewardly-extending members and adapted to engage with the periphery of the wheel, means for locating said arms at an equal distance from the vertical gauge arm, and a pointer and a scale associated with the gauge arm and the base for indicating the camber angle of the wheel being tested.

17. A gauge of the class described comprising a base having a centrally positioned pointer about which the base can be moved as a pivot horizontally and a scale located on both sides of a central line through the base and its pointer, the base being formed to permit view of the floor adjacent the scale, a vertical gauge arm pivotally mounted on said base and having sidewardly-extending members for contacting with the sides of a wheel, two contact arms slidingly mounted on the sidewardly-extending members and adapted to engage with the periphery of the wheel, means for locating said arms at an equal distance from the vertical gauge arm, and a pointer and a scale associated with the gauge arm and the base for indicating the camber angle of the wheel being tested.

18. A gauge of the class described comprising a base, having a centrally positioned pointer about which the base can be moved as a pivot horizontally and a scale located on both sides of the central line through the base and its pointer, the base being apertured to permit view of the floor adjacent the scale, a vertical gauge arm pivotally mounted on said base and having sidewardly-extending members for contacting with the sides of a wheel, two contact arms slidingly mounted on the sidewardly-extending members and adapted to engage with the periphery of the wheel, means for locating said arms at an equal distance from the vertical gauge arm, and a pointer and a scale associated with the gauge arm and the base for indicating the camber angle of the wheel being tested.

19. A gauge of the class described comprising a base, a vertical gauge arm pivotally mounted on said base and having sidewardly-extending members for contacting with the sides of a wheel, two contact arms slidingly mounted on the sidewardly-extending members and adapted to engage with the periphery of the wheel, scales on said sidewardly-extending members for locating said arms at an equal distance from the vertical gauge arm for centering the gauge with reference to the wheel, and a pointer and a scale associated with the gauge arm and the base for indicating the camber angle of the wheel being tested.

20. A gauge of the class described comprising a base having a centrally positioned pointer about which the base can be moved as a pivot horizontally, supplemental means for locating said base as to a line on its resting surface, a vertical gauge arm pivotally mounted on said base and having sidewardly-extending members in the same plane as the vertical arm for contacting with the sides of a wheel, and a scale associated with the gauge arm and the base for indicating the camber angle of the wheel.

21. A gauge of the class described comprising a base having a centrally positioned pointer about which the base can be moved as a pivot horizontally, supplemental means for locating said base as to a line on its resting surface, a vertical gauge arm pivotally mounted on said base and having sidewardly-extending members in the same plane as the vertical arm for contacting with the sides of a wheel, and a scale associated with the gauge arm and the base for indicating the camber angle of the wheel, the pointer being centrally positioned with reference to the vertical gauge arm.

22. A gauge of the class described comprising a flat-bottomed base so constructed that it stands upright on a level floor, an upwardly projecting pedestal on the base, a vertical gauge arm pivotally mounted on said pedestal above said base and having sidewardly-extending members at equal angles to the gauge arm for contact with the side of the tire of a wheel, said arm and said members lying in the same plane, and a pointer and a scale associated with the gauge arm and mounted on the base for indicating the camber angle of the wheel, the gauge being a portable unit operative on any level floor.

23. A gauge of the class described comprising a base, a vertical gauge arm pivitally mounted on said base and having sidewardly extending members for contacting the sides of a wheel, indicating means associated with said gauge arm and indicating means associated with said base for indicating the camber angle of a wheel being tested, a scale diagram for locating the position of a vehicle wheel on its resting surface, and indicating means associated with said base for locating the position of a wheel on the scale diagram.

24. A gauge of the class described comprising a base, a vertical gauge arm pivotally mounted on said base and having sidewardly extending members for contacting the sides of a wheel, indicating means associated with said gauge arm and indicating means associated with said base for indicating the camber angle of a wheel being tested, a scale diagram for locating the position of a vehicle wheel on its resting surface, indicating means associated with said base for locating the position of a wheel on the scale diagram, and a pointer associated with the base for indicating its position as to the line of the scale diagram.

25. A gauge of the class described comprising a base, a vertical gauge arm pivotally mounted on said base and having sidewardly extending members for contacting the sides of a wheel, indicating means associated with said gauge arm and indicating means associated with said base for indicating the camber angle of a wheel being tested, a scale diagram for locating the position of a vehicle wheel on its resting surface, indicating means associated with said base for locating the position of a wheel on the scale diagram, and a pointer associated with the base for indicating its position as to the line of the scale diagram, the scale diagram including a straight line extending the distance of the wheel base of a vehicle.

26. A gauge of the class described comprising a base, a vertical gauge arm pivotally mounted on said base and having sidewardly extending members for contacting the sides of a wheel, indicating means associated with said gauge arm and indicating means associated with said base for indicating the camber angle of a wheel being tested, a scale diagram for locating the position of a vehicle wheel on its resting surface, and indicating means on the sidewardly extending members for locating its center as to the base center.

27. A gauge of the class described comprising a base, and an upwardly extending arm positioned on the base, the upwardly extending arm forming two right angles with the bottom of the base transversely to the base center front and rearline, said base having a centrally located pointer about which the base can be moved as a pivot for locating the position of a vehicle wheel as to its resting place.

28. A gauge of the class described comprising a base, a vertical gauge arm pivotally mounted on said base and having sidewardly extending members for contacting the sides of a wheel, indicating means associated with said gauge arm and indicating means associated with said base for indicating the camber angle of a wheel being tested, a scale diagram for locating the position of a vehicle wheel on its resting surface, indicating means on the sidewardly extending members for locating its center as to the base center, and a scale adjacent a central line through the base and its pointer for locating the position of a vehicle wheel.

29. A gauge of the class described comprising a base, an upwardly extending arm positioned on the base, the upwardly extending arm forming two right angles with the bottom of the base transversely to the base center front and rear line, said base having a centrally located pointer about which the base can be moved as a pivot for locating the position of a vehicle wheel as to its resting place, and a scale diagram for locating the position of a vehicle wheel on its resting surface.

30. A gauge of the class described comprising a base, an upwardly extending arm positioned on the base, the upwardly extending arm forming two right angles with the bottom of the base transversely to the base center front and rear line, said base having a centrally located pointer about which the base can be moved as a pivot for locating the position of a vehicle wheel as to its resting place, a scale diagram for locating the position of a vehicle wheel on its resting surface, and indicating means associated with said base for locating the position of a wheel on the scale diagram.

31. A gauge of the class described comprising a base, an upwardly extending arm positioned on the base, the upwardly extending arm forming two right angles with the bottom of the base transversely to the base center front and rear line, said base having a centrally located pointer about which the base can be moved as a pivot for locating the position of a vehicle wheel as to its resting place, and indicating means on the upwardly extending member for locating its center position as to the base center.

32. A gauge of the class described comprising a base, an upwardly extending arm positioned on the base, the upwardly extending arm forming two right angles with the bottom of the base transversely to the base center front and rear line, said base having a centrally located pointer about which the base can be moved as a pivot for locating the position of a vehicle wheel as to its resting place, and indicating means mounted on the arm and engageable with the wheel for locating the center of a vehicle wheel.

33. A gauge of the class described comprising a base forming an angle at one side and a pointer at the apex of the angle, a gauge arm pivotally mounted on said base and having sidewardly extending members for contacting with the sides of a wheel, and indicating means associated with said base and indicating means mounted on said gauge arm and engageable with the wheel for indicating the angle of the pivotal support of a vehicle wheel.

34. A gauge of the class described comprising a base forming an angle at one side and a pointer at the apex of the angle, a vertical gauge arm on said base having sidewardly extending members for contacting the side of a wheel, and indicating means on said sidewardly extending members for indicating its center position as to the base center line for indicating the wheel base of a vehicle.

OSWIN HAUCKE.